3,307,843
INDEPENDENT MOBILE JAW AND METHOD
OF MANUFACTURING SAME
Edouard M. Torossian, Zurich, Switzerland, assignor to
Wilton Corporation, a corporation of Illinois
Filed Apr. 13, 1962, Ser. No. 187,331
Claims priority, application Switzerland, Apr. 19, 1961,
4,480/61
8 Claims. (Cl. 269—157)

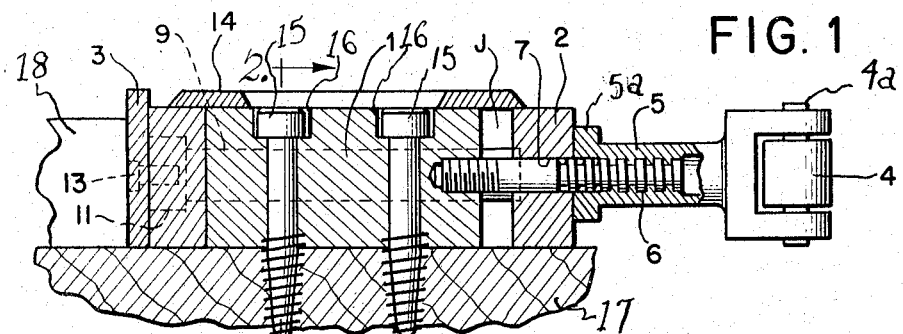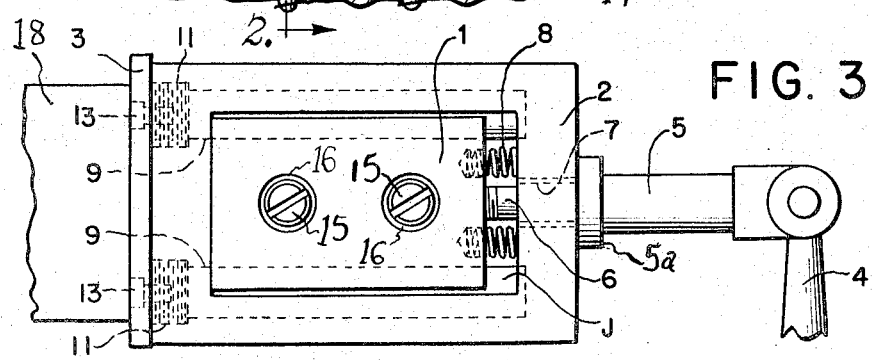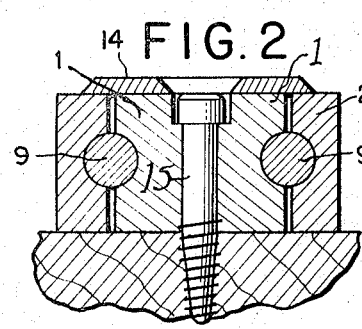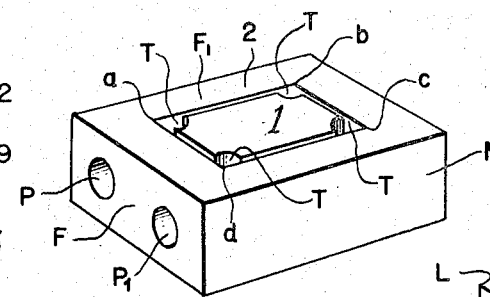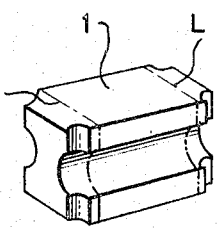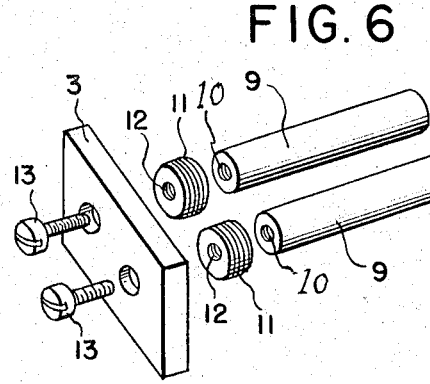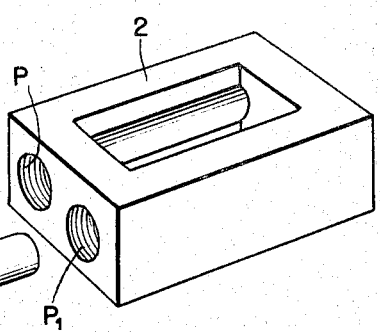
INVENTOR.
Edouard M. Torossian
BY John F. Brezina
His Attorney United States Patent Office 3,307,843
Patented Mar. 7, 1967

The invention relates to an independent mobile jaw which is adapted to be fixed in various positions and connected to tables or other parts of machine tools or the like, and which comprises a positioned base in the opening of a frame, said frame being adapted to slide transversely or longitudinally relative to said base, and relates to a method of manufacturing such a jaw.

This jaw device comprises two main parts: A base which is intended to be fixed to a table by tie bolts etc. in varying positions and a mobile part capable of limited movement relatively to the base, and a work engaging supporting jaw face element, and such dispacement can be controlled by any suitable means, of a mechanical, hydraulic or hydro-pneumatic type.

Such jaws being intended in many cases for the holding, fixing and machining of very large workpieces, and their essential characteristic consists in a novel construction and in the strength of the parts and the perfection of the fits and of the sliding of the guide member on which a work-engaging element is mounted, all of which characteristics are very expensive to achieve with conventional designs and presently known methods of manufacture.

It is the principal object of the invention to provide movable jaws with slidable guiding means in which the maximum size, strength and accuracy are combined with a minimum cost price.

To this end my mobile independent jaw according to the invention is characterized by at least one slideway extending through the frame and the base, and which is adapted to guide a slidable member to which a work-engaging plate is connected.

It is a further object of the invention to improve the methods of manufacturing such jaws. A preferred method of manufacturing a jaw in accordance with the invention consists in drilling two slideway perforations and perpendicularly thereto, four holes which are aligned and spaced apart in two's to the axes of the perforations, the four holes representing the four corners of the base, and the opposite ends of the base between these four holes are then sawed along a substantially straight path from one hole to the other in order to enable the base to be removed or extracted, the four holes remaining in the base. Thereby, as a result of such cutting, the ends of the base are in positions perpendicular to the slideways, the said cutting off of the end portions, thus eliminating the holes in the base, in order to obtain a clearance or spacing between the base and the inner end face of the frame.

One form of embodiment of the mobile independent jaw according to the invention is illustrated by way of example in the accompanying drawing, in which:

FIGURE 1 is a diagrammatic longitudinal sectional view of a jaw finished in accordance with the invention;

FIGURE 2 is a vertical section view of the jaw of FIGURE 1 taken on the line II—II;

FIGURE 3 is a plan view of the same;

FIGURE 4 shows diagrammatically and in perspective the main phases of machining of the jaw of FIGURE 1;

FIGURE 5 is a perspective view showing the base after separation; and

FIGURE 6 is a perspective view showing the various elements in their order of assembly.

Referring to the drawing, 1 represents the passaged base which is adapted to be secured to a suitable supporting surface, 2 a metal frame which is mobile or slidable relatively to the base, numeral 3 the jaw face element, and numeral 4 is a suitable handle or manually grippable means which is connected to the outer and transversely passaged portion of the nut 5 by a suitable pin 4a. Nut 5 has a transversely passaged outer end portion which is preferably pivotally connected by a pin 4a to the passaged end portion of handle 4. Rod 6 is journalled in and extends through a passage in the end portion of frame 2, as shown in FIG. 1. Externally threaded rod 6 is threadingly engaged by the inner threads of nut 5, and it is rotatable in a passage formed in the end of the frame at 7. The nut 5 has a metal flange or collar 5a of metal, as shown in FIG. 1, and which engages the end face of frame 2, as shown. The inner threaded end portion of the rod 6 is threaded into a suitable threaded hole in the end portion of block base 1.

Expansion springs 8 which are mounted between the end face of the base 1 and the inner face of the frame 2 aid in returning said frame to open non-working positions.

The rotation of nut 5 is adapted to cause the slidable movement, which is normally a horizontal movement of the frame 2 toward or into engagement with a work piece 18 which is fragmentarily illustrated at the left portion of FIGS. 1 and 3. The extent of horizontal slidable movement of frame 2 to work-engaging position is within the limits permitted by the clearance J.

The machining of the device will now be described with reference to FIGURES 4 and 5. M represents a block of steel whose dimensions are slightly greater than those of the finished device so that with a minimum of machining on the six outer faces the external dimensions of the two parts, namely the base 1 and frame 2, can be obtained. Then, by starting from the end face F, two blind passages or holes P and $P_1$ are formed which are symmetrical relative to the longitudinal axis of the frame and spaced at appropriate distances therefrom. The outer portions of said holes are internally threaded, as indicated in FIG. 6.

A rectangle indicated a, b, c, d constituting the internal opening of the frame is drawn on the block face $F_1$. The sides a–b and c–d of this rectangle are in perpendicular planes passing through the longitudinal axes of the perforations P and $P_1$. Then four holes T are drilled internally at the four corners a, b, c, d of the rectangle. Using these holes for positioning of a cutting tool, the block M is sawed or otherwise cut away along this drawn rectangle, thus forming two parts, one being the base 1 (FIGURE 5) and the other frame 2 (FIGURE 6).

In order to provide the clearance J the part 1 is reduced in size along the lines L, L by suitably cutting away or removing both the end portions thereof along said lines.

After completing the making of the two parts by the various inexpensive operations described, assembly is carried out in the following way. The base 1 is placed in the frame and two accurately gauged metal guide-bars 9, which are to be used as slideways or guide members, are introduced into the chambers formed by the perforations or holes P and P₁.

Said guidebars 9 are drilled at their outer ends and the resulting holes 10 are internally threaded, as indicated in FIG. 6.

Two plugs 11 which have central internally threaded passages 12 are also externally threaded, as shown in FIG. 6.

The two guide-bars 9 are inserted into the passages P and P₁, and along the recesses in sides of the base 1. The plugs 11 are then screwed into the threaded larger portions of holes P and P₁. A metal work-engaging face plate or face element 3 has two holes formed therein. Two screws 13 are then inserted through the holes in said face plate element and threaded into the internal threads of plugs 12 respectively, and also threaded into the threaded holes 10 of the guide bars 9 respectively, to thereby securely connect said face plate to said plugs and to said guide bars and to said frame 2.

A suitably secured guard plate 14 (FIGURE 1) prevents machining residues from infiltrating into the device to prevent clogging and abnormal wear.

While the slide-ways or guide-bars 9 described are in the form of the bars 9 of circular cross-section, slide-ways of polygonal or equivalent cross-section can be substituted, if desired.

The two holes 16 are suitably formed in spaced apart position in the base 1 and their upper portions preferably countersunk, and suitable lag screws 15 or the like are mounted in the positions as illustrated in FIGS. 1 and 3 to mount the said device in the desired position relative to a bench or other supporting surface.

It will also be noted that the connecting screws 13, which connect the work-engaging face plate 3 with frame 2, as recited, preferably have their heads countersunk in portions of the holes in said plate 3, as indicated in dotted lines in FIG. 3.

Various large objects or work pieces such as illustrated by fragments 18, have to be releasably held during various machining and surfacing operations, it being understood that the ends or sides of such work pieces opposite to those engaged by plate 3 are suitably braced by some form of stop means. Such work pieces are temporarily positioned between some stop means (not shown) and the face of face plate 3. Thereupon manually actuated rotation of handle 4 and nut 5 will cause pushing and pressing movement of frame 2 and face plate 3 against the work pieces to thereby releasably clamp the same in position. When is desired to release the work pieces, the handle 4 and threaded nut 5 are rotated in a right hand direction to retract the nut 5 and permit the frame 2 to be pushed back toward original position by the expansion springs 8, shown in FIG. 3.

Thereupon, the frame and face plate is in a position for a new gripping engagement.

While the foregoing specification sets forth the invention in specific terms, it is to be understood that numerous changes in the shape, size and materials may be resorted to without departing from the spirit and scope of the invention as claimed hereinafter, and it is contemplated that various changes may be made in the embodiment of the invention herein specifically described without departing from or sacrificing any of the advantages of the invention or any features thereof.

I claim:

1. A mobile independent jaw adapted to be fixed to a machine tool table or the like, the said jaw comprising frame, said frame having an elongated opening therein within its outer portions,
   a jaw face element supported on said frame,
   an apertured base slidable within the opening of said frame,
   said frame being capable of limited displacement relatively to said base, said base and said frame having at least one slideway extending along the adjacent portions of said frame and of said base, and a guide bar mounted in said slideway.

2. A mobile independent jaw adapted to be fixed to a machine tool table, the said jaw comprising a frame,
   a jaw face element supported on said frame,
   a base mounted within the opening of said frame, said base being securable to a table, said frame being capable of sliding movement and of limited displacement relative to said base,
   and two slideways extending into and along said frame and along the sides of said base,
   a guide bar in each of said slideways, the axes of the said slideways being substantially aligned with the zones of sliding contact between the sides of said base and the inner side faces partially defining the opening of said frame.

3. A movable jaw according to claim 2 and having slideways of substantially circular cross-section and having guide-bars slidable in said slideways.

4. A mobile independent jaw adapted to be fixed to a machine tool table,
   the said jaw comprising a frame,
   a passaged jaw face element supported on said frame,
   a passaged base situated within the opening of said frame, and adapted to be secured to a table, said frame being capable of limited displacement and slidable relative to said base,
   at least one slideway extending through the adjacent portions of said frame and of said base,
   a guide-bar in said slideway, said frame having a threaded hole therein;
   a screw for connecting said jaw face element and said guide-bar, said slideway being fixed in normal use by a screwthreaded plug in said hole.

5. A mobile independent jaw adapted to be fixed to a machine tool table, the said jaw comprising a frame,
   a jaw face element supported on said frame,
   a passaged base mounted within the opening of said frame,
   said base being securable to a stationary support,
   said frame being slidable and capable of limited movement relatively to said base, and two slide-ways extending through the adjacent portions of said frame and of the side portions of said base, the axes of the said side-ways being in alignment with the zones of contact between sides of said base and the side faces of the opening of said frame,
   the end of said frame having two threaded holes therein in alignment with said slide-ways respectively which can be used for selective removal of said slide-ways, said slide-ways being fixed in normal use by a screwthreaded plug in each of said holes.

6. A jaw according to claim 5 in which said jaw face element is supported on said frame by screws each received in an axial screw-threaded hole in one of said slideway securing plugs.

7. An independent clamping jaw device adapted to be secured to a stationary support,
   a frame defining a substantially rectangular elongated opening, and having inwardly facing guide recesses in its opposite inner faces;
   said frame having an end wall passage,
   a passaged base adapted to be secured on a stationary support and having longitudinal recesses in its opposite side portions, said base being shorter than the opening in said frame;
   said guide recesses of said frame and of said base defining longitudinally extending guide passages;
   said base having a threaded end opening;
   a manually operable screw rotatable in said end wall passage and engaging said threaded end opening of said base,
   a pair of guide bars slidable in said guide passages adapted to guide the movement of said frame, and a jaw face plate removably secured on the outer ends of said guide bars adapted to engage work pieces.

8. A clamping jaw device as recited in claim 7 and having springs between said frame and said base adapted to urge said frame toward retracted position, and having screws connecting said jaw face plate and the ends of said guide bars, said screws when rotated, being adapted to push said frame and jaw face plate forwardly.

References Cited by the Examiner

UNITED STATES PATENTS

| | | | |
|---|---|---|---|
| 1,670,789 | 5/1928 | Smitmans | 269—320 |
| 1,918,469 | 7/1933 | Hargrave | 76—101 |
| 2,071,692 | 2/1937 | Hill | 269—320 |
| 2,737,215 | 3/1956 | Larson | 76—101 |

WILLIAM W. DYER, Jr., *Primary Examiner.*

W. D. BRAY, *Examiner.*